United States Patent [19]

Kasamatsu et al.

[11] 4,302,248

[45] Nov. 24, 1981

[54] HIGH MANGANESE NON-MAGNETIC STEEL WITH EXCELLENT WELDABILITY AND MACHINABILITY

[75] Inventors: Yutaka Kasamatsu, Kobe; Senri Ishioka; Makoto Yamaga, both of Kakogawa; Hiromichi Hirano, Kobe; Hitoshi Ihara, Kakogawa, all of Japan

[73] Assignee: Kobe Steel, Limited, Kobe, Japan

[21] Appl. No.: 52,591

[22] Filed: Jun. 27, 1979

[30] Foreign Application Priority Data

Jul. 4, 1978 [JP] Japan .................................. 53-81623

[51] Int. Cl.$^3$ ............................................. F16H 27/02
[52] U.S. Cl. ............................ 75/128 A; 75/128 N; 75/128 G; 75/128 P
[58] Field of Search ............ 75/128 A, 128 P, 128 E, 75/128 N, 128 G, 128 Z, 128 T, 128 W, 128 V

[56] References Cited

U.S. PATENT DOCUMENTS

| | | | |
|---|---|---|---|
| 1,561,306 | 11/1925 | Brace | 75/128 A |
| 1,574,782 | 3/1926 | Becker | 75/128 A |
| 1,732,202 | 10/1929 | Hall et al. | 75/128 A |
| 1,905,247 | 4/1933 | Scott | 75/128 A |
| 2,026,468 | 12/1935 | Hall | 75/128 A |
| 2,334,816 | 11/1943 | Frevert et al. | 75/128 A |
| 2,378,993 | 6/1945 | Franks | 75/128 A |
| 2,561,945 | 7/1951 | Payson | 75/124 |
| 2,865,740 | 12/1958 | Heger et al. | 75/123 |
| 3,062,692 | 11/1962 | Manganello et al. | 148/38 |
| 3,081,164 | 3/1963 | Schramm | 75/128 A |
| 3,118,760 | 1/1964 | Avery et al. | 75/128 A |
| 3,151,979 | 10/1964 | Carney et al. | 75/128 A |
| 3,163,526 | 12/1964 | Harpster | 75/128 A |
| 3,266,876 | 8/1966 | DeLong | 29/196.1 |
| 3,336,168 | 8/1967 | Morita et al. | 148/38 |
| 3,383,203 | 5/1968 | Baggstrom | 75/128 A |
| 3,556,777 | 1/1971 | Petry | 75/126 |
| 3,574,605 | 4/1971 | Hall et al. | 75/128 A |
| 3,615,366 | 10/1971 | Allen | 75/128 A |
| 3,711,276 | 1/1973 | Hellner et al. | 75/128 A |
| 3,839,022 | 10/1974 | Webster et al. | 75/126 H |
| 4,017,711 | 4/1977 | Honma et al. | 219/146 |
| 4,099,966 | 7/1978 | Chivinsky et al. | 75/125 |
| 4,121,953 | 10/1978 | Hull | 148/38 |
| 4,141,762 | 2/1979 | Yamaguchi et al. | 75/128 A |

FOREIGN PATENT DOCUMENTS 463252 3/1937 United Kingdom .
471088 8/1937 United Kingdom .

Primary Examiner—L. Dewayne Rutledge
Assistant Examiner—John P. Sheehan
Attorney, Agent, or Firm—Oblon, Fisher, Spivak, McClelland & Maier

[57] ABSTRACT

A high-manganese, non-magnetic steel having excellent weldability and machinability and suitable for use in the structural parts of electrical equipment or nuclear fusion equipment consisting essentially of (% by weight):

| | |
|---|---|
| carbon | 0.55–0.80 |
| silicon | 0.1–1.2 |
| manganese | 10.0–14.5 |
| nickel | 0.3–3.0 |
| chromium | 0.5–3.6 |
| nitrogen | 0.01–0.2 | balance iron and inevitable impurities. The steel may further contain at least one element of 0.01 to 1.0% of molybdenum, 0.01 to 0.5% of vanadium, 0.01 to 0.5% of niobium, 0.005 to 0.5% of titanium, 0.01 to 1.0% of zirconium, 0.0007 to 0.005% of calcium, 0.01 to 0.15% of sulfur, 0.03 to 0.2% of selenium, 0.03 to 0.2% of lead, and 0.01 to 0.8% of tin.

3 Claims, 5 Drawing Figures

FIG. 3  MICROSTRUCTURES

HIGH MANGANESE NON-MAGNETIC STEEL WITH EXCELLENT WELDABILITY AND MACHINABILITY

BACKGROUND OF THE INVENTION

1. Field of the Invention

This invention relates to high-manganese, non-magnetic steel, and more particularly to high manganese, non-magnetic steel having excellent weldability and machinability. The invention further relates to high-manganese, non-magnetic steel for use in the structural parts of electrical equipment or nuclear fusion equipment.

2. Description of the Prior Art

The structural parts of electrical equipment, particularly such equipment which involves strong magnetic fields such as large generators and motors, and the like, are generally constructed from non-magnetic steel in order to prevent magnetization of the structure and heat generation in the structural parts due to magnetic flux leakage.

Austenitic stainless steel is commonly used as a non-magnetic steel, but it has the disadvantages that it is expensive, since it contains large amounts of nickel, and that in structural uses the parts must be thicker than usual because of its relatively low yield strength.

High manganese steel is another steel which is frequently used in such applications. High manganese steel has high strength when precipitation hardened or work hardened, and hence is extensively used for pats of dynamos or motors. This steel is therefore available for use as structural parts of such electrical equipment, but it does not have good weldability or machinability, and therefore, is not well suited for structural parts, which are required to have good weldability and/or machinability. The known high-manganese steels also have a tendency to become brittle when aged for a long time at a relatively high temperature, e.g., 600° C. Therefore, they are usually subjected to a so-called solution heat treatment in which the steel is heated to a temperature of about 1100° C. and subsequently cooled rapidly. This treatment evidently presents the problem of increased manufacturing cost. On the other hand, high-manganese steel is superior to austenitic stainless steel in that it is relatively inexpensive because of the low cost of its ingredients and can be given high strength by work hardening or other treatments. Hence, if high-manganese steel had good mechanical properties as required for use as a structural material, it would find practical use as an inexpensive structural material for the structural parts of electrical equipment and the like.

In addition, heretofore, the non-magnetic austenite stainless steel plates have been generally used for the structural parts of nuclear fusion equipment, but such stainless steel plates are usually low in tensile strength and also unstable structurally as they might be magnetized when subjected to working. If the steel plates for use in the structural parts of nuclear fusion equipment are magnetized, the entire equipment may break down, so that the non-magnetic steel plates having high strength are required for such structural parts.

Hence, a need has continued to exist for a high-manganese non-magnetic steel having the mechanical properties required for the structural parts of nuclear fusion equipment as well as those of electrical equipment, especially good weldability and good machinability.

The high-manganese non-magnetic steel of this invention has eliminated the above-mentioned shortcomings of the conventional stainless steel. The yield strength is about 20Kg/mm$^2$ in the case of the stainless steel, but it is as high as 30Kg/mm$^2$ or more in the case of the present high-mangasese non-magnetic steel. The degree of non-magnetism of the high-manganese non-magnetic steel remains almost unchanged even when it is subjected to working such as cold rolling. Also, this steel is less expensive than the stainless steel.

As is apparent from the above, the present inventors have attempted to develop a high-manganese non-magnetic steel which is less expensive than austenitic stainless steel and which also has good mechanical properties as required for structural parts of electrical equipment or nuclear fusion equipment, especially the properties of good weldability and good machinability. They have discovered, as a result of their invenstigations, that such a steel can be prepared by providing a specified nickel content. This invention rests on this discovery.

SUMMARY OF THE INVENTION

Accordingly, it is an object of this invention to provide a high-manganese, non-magnetic steel.

A further object is to provide a high-manganese, non-magnetic steel suitable for use in the structural parts of electrical equipment or nuclear fusion equipment.

A further object is to provide a high-manganese, non-magnetic steel which has good weldability and good machinability.

Further objects will become apparent from the following description of the invention.

Thus, according to the invention, a high-manganese, non-magnetic steel is provided having excellent weldability and machinability, having the composition (% by weight):

| | |
|---|---|
| Carbon | 0.55–0.80% |
| Silicon | 0.1–1.2 |
| Manganese | 10.0–14.5 |
| Nickel | 0.3–3.0 |
| Chromium | 0.5–3.6 |
| Nitrogen | 0.01–0.2 | balance iron and inevitable impurities.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein.

DESCRIPTION OF THE PREFERRED EMBODIMENTS

Figure 1:
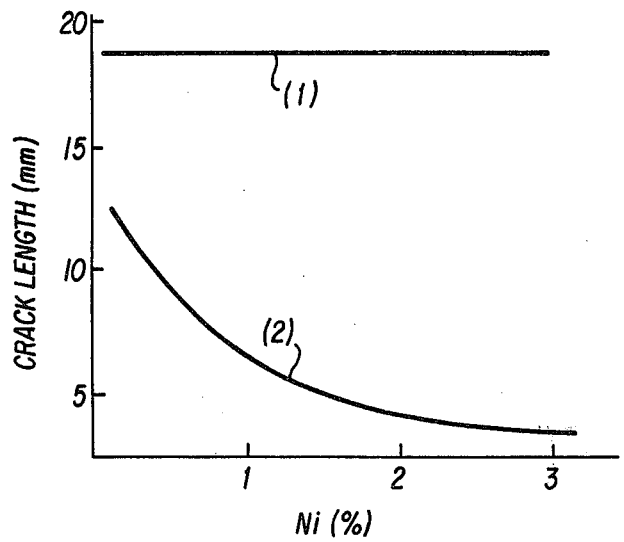
FIG. 1 is a graph showing the effect of nickel content of the steel on hot cracking.

The nickel content of the high-manganese steel of this invention provides the steel with improved weldability and machinability. Nickel is generally known as an element which improves weldability in steels, but its effect has hitherto been thought to be limited to materials having a ferrite or martensite structure, while it has been known that nickel often produces an adverse effect when used in a steel having an austenitic structure such as the steel of this invention. For instance, in welding type 304 austenite stainless steel, an austenitic alloy, an increase of nickel content causes a diminution of the ferrite structure while enhancing hot cracking. (Generally, the weldability of a steel having an austenitic structure is evaluated by observing the susceptibility to hot cracking at the grain boundary.) This effect of increased nickel is detrimental to weldability. For these reasons, there is as yet no established theory of the effect of adding nickel to alloys having the austenite structure. As a result of their studies the present inventors have discovered that the effect on weldability of adding nickel is closely related to the amount of carbon present in the steel. If the carbon exceeds about 0.8%, addition of nickel produces almost no appreciable effect in large heat input welding. When the carbon content is less than 0.8%, on the other hand, addition of nickel within a certain range tends to greatly improve the weldability. This peculiar behavior of nickel has not been noticed heretofore and was discovered for the first time by the inventors.

The addition of nickel, as specified in this invention, can also improve the machinability of high-manganese steel, which is generally readily work hardenable. This beneficial effect results because nickel reduces the tendency of the steel to work harden during machining and thus decreases tip wear of the cutting tool.

Thus, the addition of nickel within the range defined in this invention can significantly improve the mechanical properties of high-manganese steel and accordingly, make it more suitable for structural application. Although the material cost is slightly increased by the addition of nickel in the specified amounts, it has been found that the addition of nickel produces economic benefits when the entire use cycle is considered, because of the improved machinability of the steel.

The carbon content of the steel of this invention causes the structure to be austenitic. It remains in the alloy as a solid solution and stabilizes the non-magnetic property of the steel. It also contributes greatly to the mechanical strength. Since carbon is an inexpensive element, it is preferable to add it in as great an amount as possible in order to secure its beneficial effects to the maximum degree. Therefore, the carbon content of the steel of this invention is defined as not less than about 0.55%. If the carbon content is less than about 0.55%, the mechanical strength of the steel as defined by the yield strength proves to be unsatisfactory. However, if the carbon content is too low, the austenite structure is not well stabilized, and the magnetic permeability may increase when the steel is formed into structural shapes by cold working. On the other hand, if carbon is added in excess, the effect of added nickel discussed above does not occur, and under this condition, the object of this invention cannot be attained. More specifically, when the carbon content exceeds about 0.8%, the carbides tend to precipitate, and consequently, the weldability is decreased, even though nickel may be present within the defined range, as described in more detail later. In this case, even if the steel is given a stress-relieving heat treatment after welding, the carbides still remain in the alloy and affect the mechanical properties while at the same time impairing the hot workability of the steel. Thus, the range of carbon content of the steel of this invention is defined as about 0.55 to about 0.8%.

Silicon has a deoxidizing action during steel melting and enhances the fluidity of the molten steel during casting into ingots, which decreases the number of internal defects in the ingot. In order to produce this effect, silicon should be added in an amount of not less than about 0.1%. Silicon is also effective in increasing the strength of the austenite matrix, but addition in excess impairs not only the high temperature ductility of the steel, but also its weldability. Therefore, the upper limit of the silicon content is about 1.2%.

Manganses is an austenite stabilizing element. It is an essential constituent of the steel of this invention and is included in an amount of not less than about 10%. Although an austenite structure can be formed if the amount of manganese is less than 10%, it has a relatively low stability and the permeability of the steel tends to increase when it is subjected to cold working. It is therefore desirable to include this element in a relatively high concentration in order to have low permeability; however, addition of more than about 14.5% may produce deterioration of the hot workability as well as the machinability of the steel. Hence, the preferred range of manganese content is from about 10 to about 14.5%.

Figure 3:
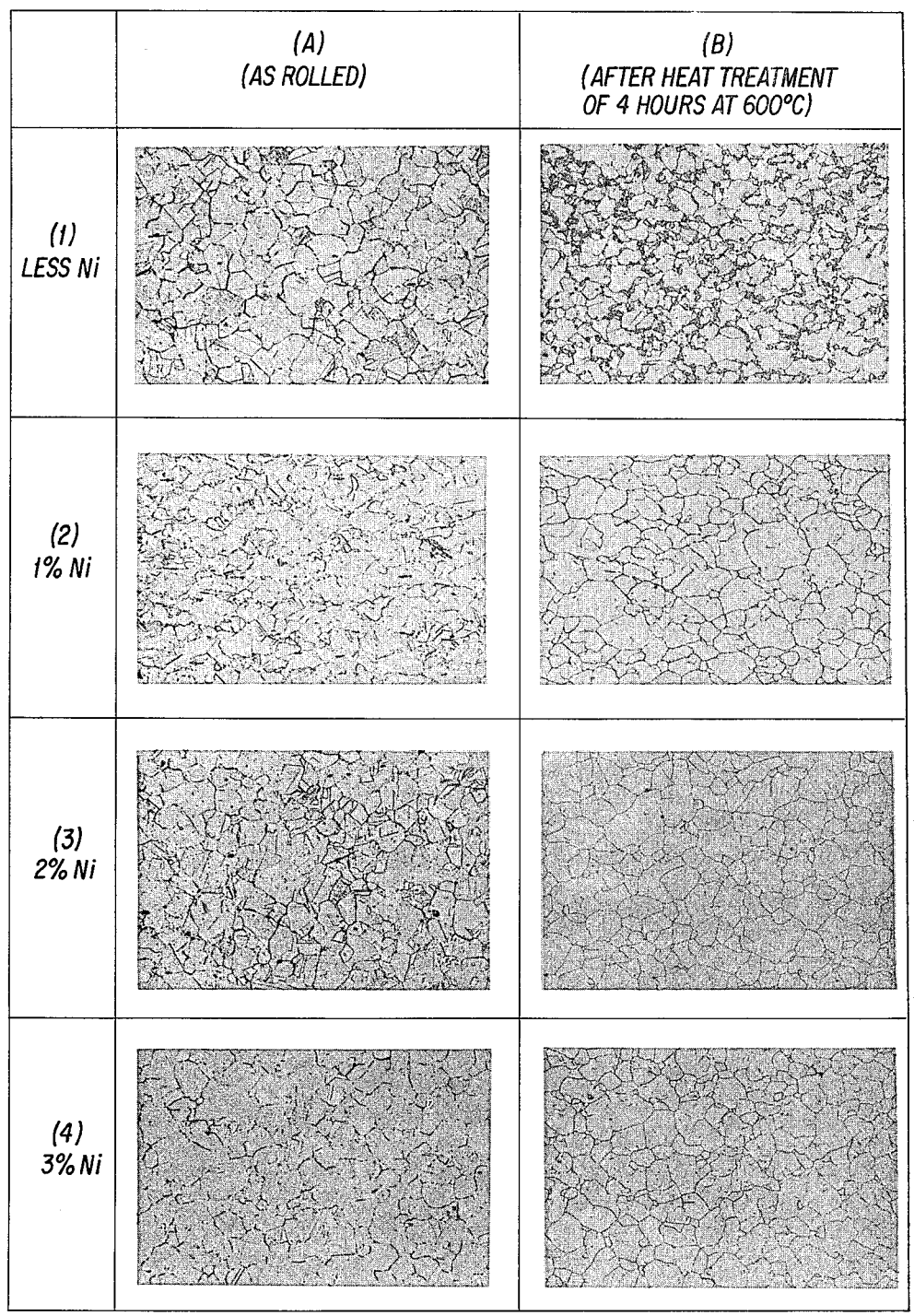
FIG. 3 shows photographs of the microstructures of high-manganese steels containing various amounts of nickel.

Nickel is an element which characterized the steel of this invention. It is added with the intention of producing the specific effect of improving both the weldability and the machinability of the steel. The nickel can remain as a substitutional solid solution alloy in the austenite matrix whereby the structure is stabilized. Since it has the effect of preventing not only coarsening of the crystal grains at the bond and in the weld heat affected zone during large heat input welding but also precipitation of the carbides, it greatly conduces to the improvement of the mechanical properties of the product steel. The effectiveness of the nickel is closely related to the carbon content. FIG. 1 is a graph showing the effect of the nickel content on hot cracking as observed in a welding test (Verestraint hot cracking test) conducted on high manganese steels with different carbon contents under the specific conditions of relatively large heat input welding. In the graph, curve (1) represents the case in which the carbon content is 1.0% and curve (2) represents the case in which the carbon content is 0.7%. The results show that when the carbon content is 1.0%(curve(1)), the crack length is large and is not decreased by addition of nickel, whereas when the carbon content is 0.7%, a pronounced decrease in the crack length occurs with increased nickel content. The detailed investigations of the inventors established that the weld crack susceptibility can be strikingly reduced by adding nickel in an amount greater than about 0.3% while keeping the carbon content to a value not greater than 0.8%. This very surprising effect of added nickel on the weldability may be attributed to the stabilization of the fine crystal grains as shown in FIG. 3, which shows photomicrographs of the microstructures of some steels of this invention. The test steels were prepared by adding nickel to a steel containing the following elements: carbon 0.6%, manganese 14%, chromium 2%. Nickel was present in amount of 0% (1), 1% (2), 2% (3) and 3% (4). Column (A) shows the microstructures of the steels as rolled, and column (B) shows the microstructures of the steels after stress-relieving heat treatment at 650° C. for four hours. The magnification in each case is 100×. The above improvement is not obtained when the carbon content exceeds 0.8%. This is believed to be due to the fact that the carbide precipitation is very difficult to suppress when the carbon content is so great. Therefore, there does not appear to be any effective method for suppressing weld cracking in large heat input welding of such steels.

The addition of nickel has the additional effects of reducing the tendency of high manganese steel to work harden and also of improving its machinability.

Figure 2:
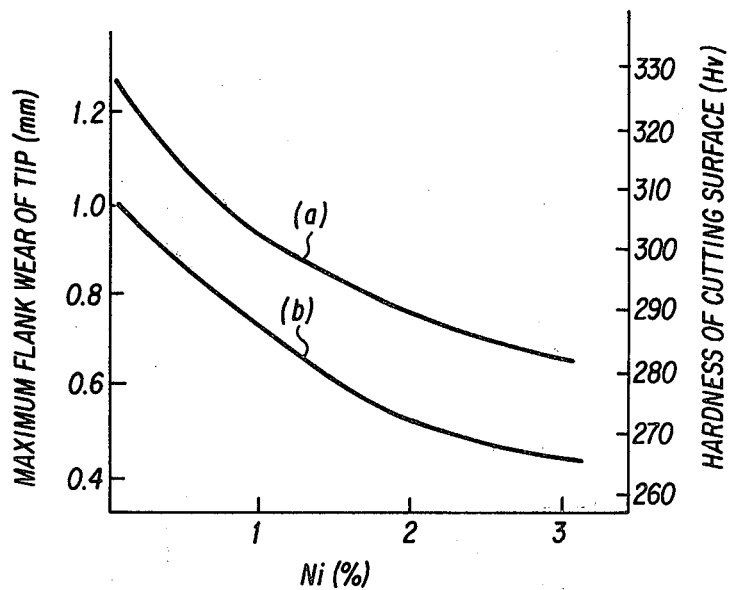
FIG. 2 is a graph showing the effect of nickel content of the steel on the hardness of the cutting surface and on tip wear.

FIG. 2 is a graph showing the effect of the nickel content of the hardness of the cutting surface (Hv) and maximum flank wear on the tip (mm) of the cutting tool (engage angle: 20°; depth of cut: 3 mm; cutting rate: 40 m/min; feed: 0.15 mm/tooth; cutting time 15 minutes). In the graph curve (a) shows the hardness of the cutting surface and curve (b) shows the maximum flank wear of the tip. As can be seen from the graph, work-hardening by cutting is reduced with increased nickel content, and an improvement in machinability, as indicated by the reduced tip wear, is evident.

The improvement in weldability and machinability with addition of nickel increases in proportion to the nickel content provided that it is not less than 0.3%. However, when the nickel content exceeds about 3.0%, no further proportional increase of its beneficial effect occurs; hence such addition becomes economically disadvantageous. Therefore, in this invention, the nickel content is held within the range of about 0.3% to 3.0%.

Figure 4:
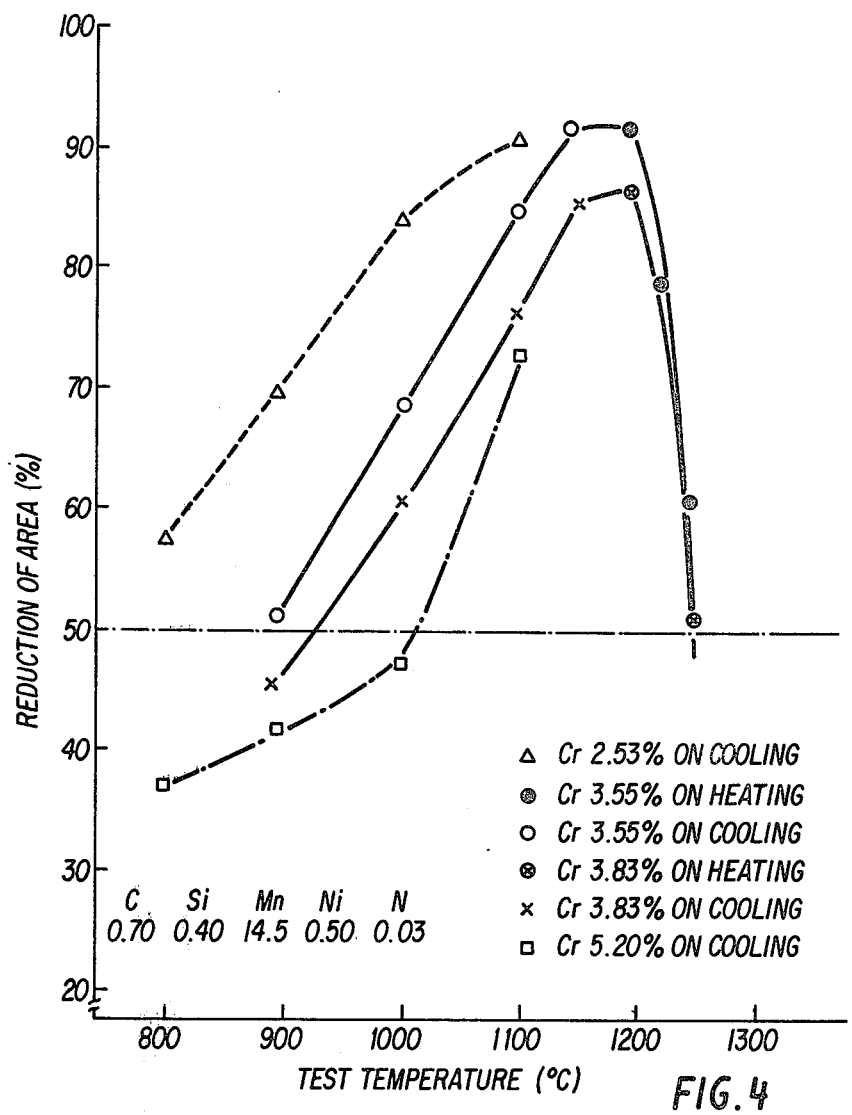
FIG. 4 is a graph showing the results of a high-speed, high-temperature tensile strength test for a number of high-manganese steels having various proportions of chromium.
Figure 5:
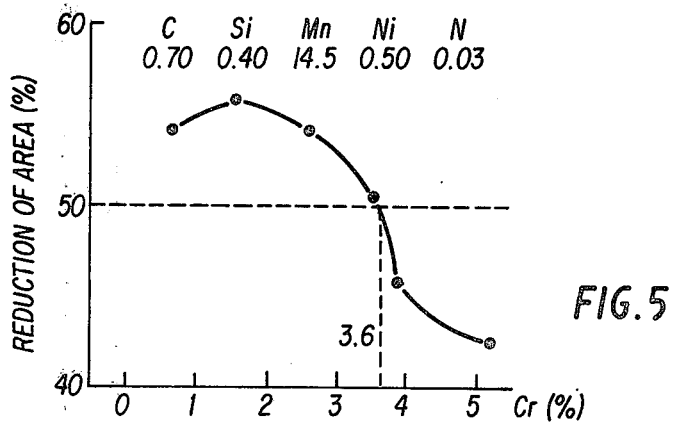
FIG. 5 is a graph showing the effect of chromium content on reduction of area in the high-speed, high-temperature tensile strength test.

The presence of chromium in proper amounts is useful for stabilizing the austenite structure and enhances the strength of the austenite matrix. It also controls precipitation of the $Fe_3C$ carbides at the grain boundary, which improves weldability. For this purpose it is added in an amount not less than about 0.5%. However, an excessive amount of chromium impairs the hot workability of the steel and leads to an extreme increase in strength which adversely affects the machinability. In view of the deleterious effects of excessive chromium, the amount of this element must be not greater than the critical upper limit of 3.6%. The deterioration in hot workability produced by excessive chromium can be measured by the reduction in area of steel samples in a high-temperature, high-speed tensile test. If the reduction in area of the sample when tested at a given temperature is not less than 50%, the hot workability at that temperature is considered good. The results of tests performed on a number of steels having different amounts of chromium are given in FIG. 4. The high speed tensile tests are conducted after one of two possible heating procedures. The tests marked "on heating" were conducted after the sample was heated to the indicated temperature at a rate of 100° C. per second. The tests marked "on cooling" were conducted on samples which had been heated to a temperature of 1250° C. at a rate of 100° C. per minute, held at that temperature for a period of one minute, and then cooled to the measurement temperature at a somewhat slower rate. Using the above defined criterion of hot-workability, it may be seen that the upper limit of hot workability of the steels of this invention is about 1250° C. The lower limit of the temperature range of hot workability varies with the proportion of chromium content; however, in order for a steel to be considered to have good hot workability, it must be hot workable at a temperature of 900° C.; that is, the reduction of area in the high-temperature, high-speed tensile test must be greater than 50% at 900° C. It is evident that when the chromium content of the steel is 3.55%, this criterion is satisfied, while when the chromium content is 3.83%, the criterion is not satisfied. FIG. 5 shows the relationship between the reduction of area in the high-temperature, high-speed tensile test at 900° C. and the chromium content for steels according to this invention. As may be seen from the figure, the hot workability deteriorates rapidly as the chromium content is increased, and the upper limit of suitable hot workability is about 3.6%. Therefore, the upper limit of the chromium content in the steels of this invention is set at 3.6%.

Nitrogen is an austenite stabilizing element and is of use for increasing strength and affording good ductility at high temperature. This effect is produced by the presence of only about 0.01% nitrogen, which is the normal standard level of ingots from the electric furnace. Increasing the amount of nitrogen permits decreasing the carbon content and also decreases carbide precipitation, so that, in this sense, the higher the nitrogen content, the better. However, an excess amount of nitrogen tends to give rise to welding defects such as blow holes during welding, so that approximately 0.2% is suggested as the upper limit. Particularly, in the case of electron beam welding where a large heat input is required, the presence of not more than about 0.05% of nitrogen is desirable. Hence, the nitrogen content in the steel of this invention is defined to be within the range of about 0.01 to 0.2%, preferably about 0.01 to 0.05%.

In addition to the essential ingredients enumerated above, a number of additional elements, as discussed more fully below, are also recommended for blending into the steel of this invention. These additional elements, if used in the proper amounts, can further improve the mechanical strength, the weldability, and/or the machinability without affecting the essential properties of the steel.

Molybdenum is effective for increasing the strength of the austenite matrix; to produce this effect it is necessary to add it in an amount not less than about 0.01%. However, excess molybdenum is detrimental to both weldability and machinability. Addition of up to about 2.0% is acceptable with respect to the weldability, but the machinability is decreased if the molybdenum content exceeds about 1.0%. Therefore, the molybdenum content in the steel of this invention is selected from within the range of about 0.01 to 1.0%.

Vanadium and niobium are both helpful in strengthening the austenite matrix and also promote precipitation of the carbides in the matrix, which greatly tends to enhance the strength of the steel. If no precipitation of carbides takes place at the grain boundary, weldability is not impaired; therefore, blending of these elements with their grain refining effect is rather advantageous for obtaining rolled materials with fine crystal structure. Also, amost no deterioration of machinability takes place with this increase in strength. Therefore, it is recommended to add vanadium and niobium in amounts of not less than about 0.01% each. However, excessive addition of these elements causes excessive precipitation of carbides at the grain boundary during the heat treatment after welding, which results in inferior mechanical properties and machinability. Therefore, it is preferable to add one or both of them in amounts of not more than 0.5%.

Titanium and zirconium have no direct effect on strength and machinability within the ranges defined in this invention. However, they are beneficial in refining the columnar structure and improving ductility at high temperatures, which has a favorable effect on the weldability. Addition of these elements proves particularly effective where welding must be conducted under the constraints imposed by large heat input. According to this invention, therefore, one or both of these elements are added in amounts of about 0.005 to 0.5% for titanium and about 0.01 to 1.0% for zirconium.

Calcium serves as a deoxidizer or desulfurizer and has the effects of spehoidizing the non-metallic inclusion MnS and controlling anisotropy of the mechanical properties while improving machinability. This element is therefore added in an amount not less than about 0.0007% in the steel of this invention. However, excessive amounts may lead to increase of inclusions in the steel, resulting in inferior mechanical properties. Therefore, about 0.005% is suggested as the upper limit.

Sulfur, selenium, lead and tin are known as elements which are useful in improving machinability, and, in order to make use of this effect, one or more of these elements may be added to the steel of this invention. These elements, however, cannot be added in large quantities because they tend to form lower melting compounds at the grain boundary which adversely affects the weldability. Therefore, these elements are added, when desired, in amounts of about 0.01 to 0.15% for sulfur, about 0.03 to 0.2% for selenium, about 0.03 to 0.02% for lead and about 0.01 to 0.8% for tin. These elements when present in combination with calcium can further improve the machinability without harming the weldability, so that it is preferable to add one or more of these elements together with the above-defined amount of calcium.

The impurities which are tolerated in the steel of this invention are present in amounts which are customarily considered acceptable in steel of this type.

Having generally described this invention, a more complete understanding can be obtained by reference to certain specific examples, which are provided herein for purposes of illustration only and are not intended to be limiting unless otherwise specified.

EXAMPLES 1-17

High manganese steel specimens having the compositions shown in Table 1 were subjected to blooming and hot rolling, and their weldability and machinability were tested. Also, the mechanical properties and magnetic permeabilities of the steels as rolled and after being subjected to a stress-relieving heat treatment (650° C. for four hours) were measured. The results of the tests are shown in Table 2. In these tables Specimen Nos. 1-9 are steels according to this invention, while Nos. 10-17 are comparative steels.

As is apparent from the results shown in Table 2, the steels of this invention are excellent both in weldability and machinability and much superior to the comparative products in these respects. They also present no problems in hot workability. Furthermore, the steels of this invention possess good mechanical properties in the as-rolled condition and/or after the stress-relieving heat treatment and the magnetic permeability is stabilized at a low value. These properties are comparable with or better than those of the comparative tests.

TABLE 1

| | | | | | | CHEMICAL COMPOSITIONS OF TESTED STEELS (WT. %) | |
|---|---|---|---|---|---|---|---|
| | C | Si | Mn | Ni | Cr | N | Other Components | Remarks |
| 1 | 0.62 | 0.31 | 14.05 | 2.14 | 1.97 | 0.021 | — | |
| 2 | 0.75 | 0.28 | 12.04 | 1.03 | 2.78 | 0.038 | — | |
| 3 | 0.65 | 0.30 | 14.13 | 0.45 | 3.58 | 0.022 | — | |
| 4 | 0.72 | 0.54 | 14.45 | 2.85 | 0.62 | 0.056 | — | |
| 5 | 0.64 | 0.40 | 14.11 | 2.00 | 2.04 | 0.020 | Mo 0.72— | Steels of this Invention |
| 6 | 0.65 | 0.23 | 13.89 | 0.37 | 2.02 | 0.033 | V 0.04, Nb 0.02, Zr 0.03 | |
| 7 | 0.60 | 0.44 | 11.28 | 1.88 | 0.71 | 0.040 | Ti 0.02 | |
| 8 | 0.76 | 0.35 | 12.41 | 2.02 | 1.55 | 0.037 | Ca 0.001, S 0.082, Se 0.11 | |
| 9 | 0.73 | 0.60 | 14.01 | 2.74 | 0.94 | 0.048 | Mo 0.22, Ca 0.001, Ti 0.02, Pb 0.05, Sn 0.05 | |
| 10 | 0.44 | 0.40 | 14.31 | 2.33 | 2.12 | 0.030 | — | |
| 11 | 0.98 | 0.31 | 11.45 | 1.05 | 2.23 | 0.024 | — | |
| 12 | 0.78 | 0.47 | 9.06 | 2.79 | 4.16 | 0.026 | — | Comparative Steels |
| 13 | 0.55 | 0.30 | 16.23 | 0.11 | 3.15 | 0.038 | — | |
| 14 | 0.64 | 0.36 | 13.45 | 2.81 | 5.32 | 0.085 | — | |
| 15 | 0.62 | 0.33 | 13.59 | 2.13 | 1.86 | 0.044 | Mo 1.51 | |
| 16 | 0.58 | 0.40 | 13.75 | 1.98 | 1.95 | 0.032 | Zr 0.03, S 0.24 | |
| 17 | 0.75 | 0.53 | 14.32 | 0.55 | 3.83 | 0.032 | — | |

TABLE 2

| | PROPERTIES OF TESTED STEELS | | | | | | | | |
|---|---|---|---|---|---|---|---|---|---|
| No. | Yield Strength (kg/mm$^2$) | Tensile Strength (kg/mm$^2$) | Elongation (%) | Impact Value (vEo) (kg · m) | Permeability ($\mu$) | Weldability | Machinability | Hot Work-Ability | Remarks |
| 1 | 37.7 | 93.5 | 70.4 | 22.7 | 1.003 | | | | |
| | 36.7 | 91.7 | 58.0 | 8.6 | 1.003 | 0 | 0 | 0 | |
| 2 | 36.5 | 93.1 | 65.8 | 16.5 | 1.004 | | | | |
| | 35.7 | 82.1 | 45.2 | 5.2 | 1.007 | 0 | 0 | 0 | |
| 3 | 38.7 | 99.4 | 68.8 | 19.8 | 1.003 | | | | |
| | 37.1 | 93.8 | 65.1 | 8.9 | 1.004 | 0 | 0 | 0 | |
| 4 | 33.3 | 96.3 | 56.3 | 19.0 | 1.004 | | | | |
| | 31.6 | 63.8 | 30.5 | 7.7 | 1.019 | ◎ | 0 | 0 | |
| 5 | 39.8 | 90.1 | 68.7 | 20.3 | 1.003 | | | | |
| | 38.7 | 84.5 | 55.0 | 7.4 | 1.003 | 0 | 0 | 0 | Steels |

TABLE 2-continued

PROPERTIES OF TESTED STEELS

| No. | Yield Strength (kg/mm²) | Tensile Strength (kg/mm²) | Elongation (%) | Impact Value (vEo) (kg·m) | Permeability (μ) | Weldability | Machinability | Hot Workability | Remarks |
|---|---|---|---|---|---|---|---|---|---|
| 6 | 43.1 | 87.4 | 71.3 | 21.1 | 1.002 | ◎ | | | of this Invention |
|   | 41.0 | 86.2 | 66.4 | 10.4 | 1.004 |   | 0 | 0 | |
| 7 | 40.0 | 89.6 | 69.2 | 20.2 | 1.002 | ◎ | | | |
|   | 38.7 | 87.0 | 60.7 | 10.3 | 1.003 |   | 0 | 0 | |
| 8 | 38.4 | 86.2 | 64.1 | 14.4 | 1.004 | | | | |
|   | 35.0 | 84.3 | 58.2 | 9.3 | 1.006 | 0 | ◎ | 0 | |
| 9 | 37.1 | 99.4 | 70.3 | 18.2 | 1.003 | | | | |
|   | 36.3 | 96.7 | 67.4 | 9.4 | 1.004 | 0 | ◎ | 0 | |
| 10 | 28.3 | 78.8 | 23.5 | 5.3 | 1.012 | | | | |
|   | 25.9 | 77.1 | 19.8 | 1.7 | 1.051 | Δ | Δ | 0 | |
| 11 | 38.2 | 87.8 | 30.5 | 10.3 | 1.007 | | | | |
|   | 35.0 | 59.3 | 4.3 | 2.1 | 1.35 | Δ | 0 | 0 | |
| 12 | 34.8 | 69.3 | 50.4 | 13.0 | 1.011 | | | | Comparative Steels |
|   | 33.1 | 66.2 | 47.3 | 5.7 | 1.020 | Δ | Δ | Δ | |
| 13 | 58.3 | 113.6 | 65.1 | 15.4 | 1.003 | | | | |
|   | 52.0 | 103.2 | 59.3 | 3.2 | 1.007 | Δ | Δ | Δ | |
| 14 | 42.2 | 108.4 | 58.8 | 17.7 | 1.004 | | | | |
|   | 39.6 | 90.5 | 43.3 | 5.8 | 1.007 | 0 | Δ | Δ | |
| 15 | 42.7 | 102.2 | 69.2 | 19.3 | 1.003 | | | | |
|   | 40.0 | 89.5 | 57.1 | 7.4 | 1.004 | 0 | Δ | 0 | |
| 16 | 36.4 | 89.3 | 63.2 | 19.8 | 1.002 | | | | |
|   | 35.2 | 85.4 | 48.4 | 7.5 | 1.004 | Δ | 0 | 0 | |
| 17 | 38.1 | 92.3 | 61.6 | 16.3 | 1.004 | | | | |
|   | 36.5 | 84.8 | 51.8 | 7.0 | 1.009 | 0 | 0 | Δ | |

(Note)
The figures on the upper row in each horizontal section (1-17) show the values of steels as rolled and the figures on the lower row show the values of steels subjected to the stress-relieving heat treatment.
The marks ◎, 0 and Δ signify the results of evaluation, with mark ◎ indicating "excellent", mark 0 "good" and mark Δ "poor".

As is apparent from the above discussion, the high-manganese steel of this invention has good hot workability and is capable of normal blooming rolling or hot rolling. Also, it becomes non-magnetic upon natural air cooling after hot rolling, and its mechanical properties are excellent and stable, irrespective of plate thickness or direction of rolling. Furthermore, when the steel of this invention is used as a weldable structural steel, it is possible to use a number of different methods of welding such as electron beam welding, ordinary shielded metal arc welding, and submerged arc welding. Even when the steel is subjected to a heat treatment for relieving stress after welding, no precipitation of carbides occurs, and the magnetic permeability and other mechanical properties are, at most, slightly affected. Moreover, the steel of this invention can be machined by all types of ordinarily used machining techniques such as shaving, turning milling, drilling, tapping and the like. The machining characteristics of the steels of this invention are not inferior in comparison with those of austenitic stainless steel.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A high-manganese, non-magnetic steel possessing excellent weldability and machinability consisting essentially of the following elements (% by weight):

| carbon | 0.55–0.80 |
|---|---|
| silicon | 0.1–1.2 |
| manganese | 10.0–14.5 |
| nickel | 0.3–3.0 |
| chromium | 0.5–3.6 |
| nitrogen | 0.01–0.2 | balance iron and inevitable impurities.

2. The steel of claim 1, wherein the nitrogen content is 0.01–0.05%.

3. A high-manganese, non-magnetic steel possessing excellent weldability and machinability consisting essentially of the following elements (% by weight):

| carbon | 0.55–0.80 |
|---|---|
| silicon | 0.1–1.2 |
| manganese | 10.0–14.5 |
| nickel | 0.3–3.0 |
| chromium | 0.5–3.6 |
| nitrogen | 0.01–0.2 | and at least one element selected from the group consisting of 0.01 to 1.0% of molybdenum, 0.01 to 0.5% by vanadium, 0.01 to 0.5% of niobium, 0.005 to 0.5% of titanium, 0.01 to 1.0% of zirconium, 0.0007 to 0.0005% of calcium, 0.01 to 0.15% of sulfur, 0.03 to 0.2% of selenium, 0.03 to 0.2% of lead, and 0.01 to 0.8% of tin; and the balance iron and inevitable impurities.

* * * * *

UNITED STATES PATENT AND TRADEMARK OFFICE
CERTIFICATE OF CORRECTION

PATENT NO. : 4,302,248
DATED : November 24, 1981
INVENTOR(S) : YUTAKA KASAMATSU ET AL It is certified that error appears in the above—identified patent and that said Letters Patent is hereby corrected as shown below:

Column 1, line 31, delete "pats" and insert --parts

Column 10, line 56, delete "by" and insert --of--;

Column 10, line 58, delete "0.0005%" and insert --0.005%--.

Signed and Sealed this

Twenty-second Day of June 1982

[SEAL]

Attest:

*Attesting Officer*

GERALD J. MOSSINGHOFF
*Commissioner of Patents and Trademarks*